July 9, 1968 D. R. LIGH 3,391,722
MOTION TRANSFORMING ACTUATOR PARTICULARLY FOR HATCH COVERS
Filed Jan. 10, 1964 7 Sheets-Sheet 2

INVENTOR.
David R. Ligh
BY
Michael S. Striker

July 9, 1968  D. R. LIGH  3,391,722
MOTION TRANSFORMING ACTUATOR PARTICULARLY FOR HATCH COVERS
Filed Jan. 10, 1964  7 Sheets-Sheet 5

INVENTOR.
David R. Ligh
BY
Michael J. Striker
Atty

United States Patent Office 3,391,722
Patented July 9, 1968

3,391,722
MOTION TRANSFORMING ACTUATOR PARTICULARLY FOR HATCH COVERS
David R. Ligh, 193 Main St.,
Madison, N.J. 07940
Filed Jan. 10, 1964, Ser. No. 337,078
28 Claims. (Cl. 160—188)

The present invention relates to a motion transforming actuator, and more particularly to an actuator for transforming a rectilinear motion into a turning motion for turning a pair of hatch cover sections between a horizontal closing position and a substantially vertical folded position.

Actuators are known in which the rectilinear motion of a hydraulic piston is transformed into a turning movement by helical threads.

The known motion transforming actuators of this type have the disadvantage that helical threads are easily damaged, and are expensive to manufacture. Furthermore, the output torque is constant in the motion transforming actuator according to the prior art.

It is one object of the present invention to overcome these disadvantages of known motion transforming actuators, and to provide a motion transforming actuator of simple but extremely strong construction capable of transmitting great forces.

Another object of the invention is to provide a motion transforming actuator producing different output torques during operation, for example a greater torque at the beginning of the turning movement and a smaller torque at the end of a turning movement of the output shaft.

Another object of the invention is to provide a motion transforming actuator whose output member is automatically locked in two angularly spaced end positions.

Another object of the invention is to provide a motion transforming actuator in which the force transmitting elements are connected by rollers producing only small friction losses.

Another object of the present invention is to provide a motion transforming actuator driven by a hydraulic piston in such a manner that the hydraulic piston is not turned during a reciprocating stroke.

Another object of the invention is to provide a motion transforming actuator producing a high output torque with relatively low bearing pressures.

Another object of the invention is to provide a motion transforming actuator which can be manufactured without the use of thread cutting machines in a very economical manner.

With these objects in view, the present invention relates to a motion transforming actuator for transforming the rectilinear movement of an operating member, such as a hydraulic piston, into a turning movement of an output member. One embodiment of the invention comprises a first hollow member which is used as output member, and is formed with at least partly helical guide slots; a second member, preferably the input member, partly located in the first member and including force-transmitting means guided in the guide slots of the output member and having a portion projecting out of the same; guide means engaging and guiding the projecting portion of the force-transmitting means, and operating means, for example, a hydraulic piston and cylinder means, for reciprocating the second member so that the first member is turned.

In the preferred embodiment of the invention, the guide means has straight slots crossing the helical slots of the first member, and the force-transmitting means include radially projecting arms passing through the crossing portions of the helical and straight slots and engaging the slots with radially adjacent portions, each of which preferably supports a roller for turning movement so that the friction in the slots is susbtantially reduced.

In the preferred embodiment of the actuator, the helical slots include slot portions having different helix angles so that the torque is not constant during the turning movement of the output member, but may vary as required by the particular operation performed by the actuator.

In accordance with a modified embodiment of the invention, the end portions of the helical tracks are straight and parallel to the turning axis of the actuator so that the load torque cannot turn the output member and thereby accidentally reciprocate the input member.

The motion transforming actuator according to the invention is particularly advantageously applied to a hatch cover arrangement of the type in which two hatch cover sections are hinged together and are moved between a horizontal aligned position closing a hatch, and a substantially vertical folded position in which the hatch is open.

Hatch covers of this type require a greater force during the first part of the operation in which the hatch covers are moved out of the horizontal closing position than during the latter part of the movement in which the hatch cover sections are already partly folded. By providing the actuator with helical slots of varying helix angles, the output torque produced by the actuator can be selected in view of the variable load torque produced by the hatch cover sections. Furthermore, the hatch cover sections can be locked in the end positions thereof by providing the helical slots of the actuator with straight end portions which prevent the turning of the output member of the actuator by the weight of the folded hatch cover sections, and also prevents the raising of the hatch cover section out of the horizontal position by means other than the actuator.

Consequently, it is also an object of the present invention to provide a hatch cover actuating arrangement of extremely simple construction which can be operated by a comparatively small reciprocating motor, such as a hydraulic servo-motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
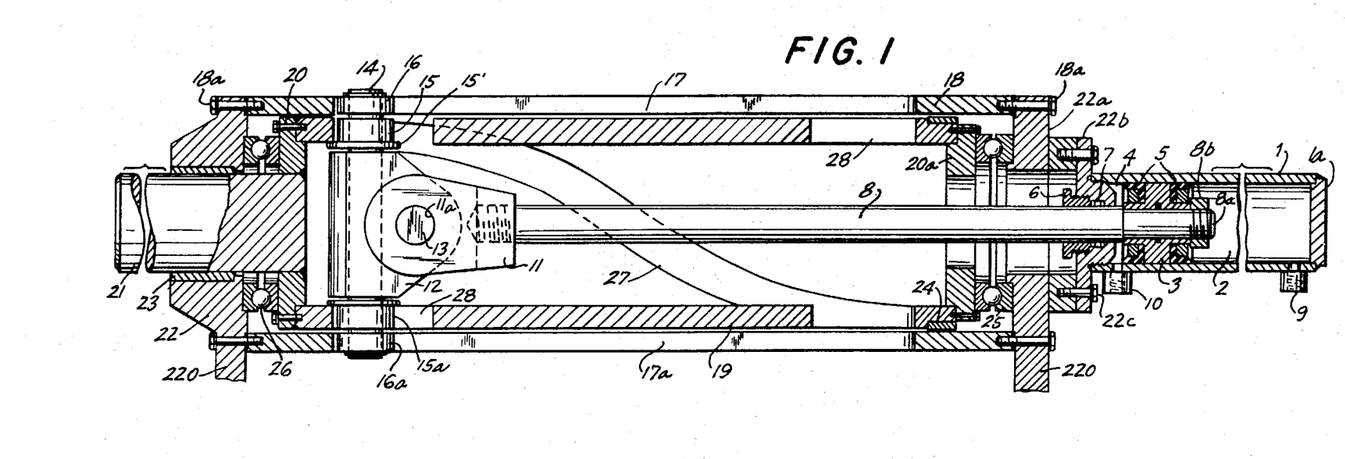
FIG. 1 is an axial sectional view of one embodiment of a motion transforming actuator according to the invention.

Referring now to the drawings, and more particularly to FIG. 1, the actuator comprises hydraulic operating means which include a hydraulic cylinder 1, in which a piston 3 is mounted for rectilinear movement. Pressure chambers 2 and 4 are formed on opposite sides of piston 3 and are separated from each other by sealing means 5 on piston 3. Ports 9 and 10 respectively communicate with pressure chambers 2 and 4, so that piston 3 moves to the left when pressure fluid is supplied through port 9 and exhausted through port 10, and moves from the left to the right as viewed in FIG. 1, when pressure fluid is supplied to port 10 and exhausted through port 9. The control of the piston movement is achieved by a manually operated valve in a manner which is conventional, and therefore not shown in the drawing. Support plates 22 and 22a are provided which are respectively supported on supporting brackets 220. Support plate 22a includes a closure plate 22b secured thereto by screws 22c and being provided with a packing 7 held in place by stuffing box 6, so that pressure chamber 4 of cylinder 1 is closed. The other end of cylinder 1 is closed by a plate 1a.

A piston rod 8 is secured to piston 3 by a nut 8b on a threaded portion 8a of piston rod 8. Packing 7 surrounds piston rod 8, and prevents leakage from pressure chamber 4 into the central opening of support member 22a.

Figure 2:
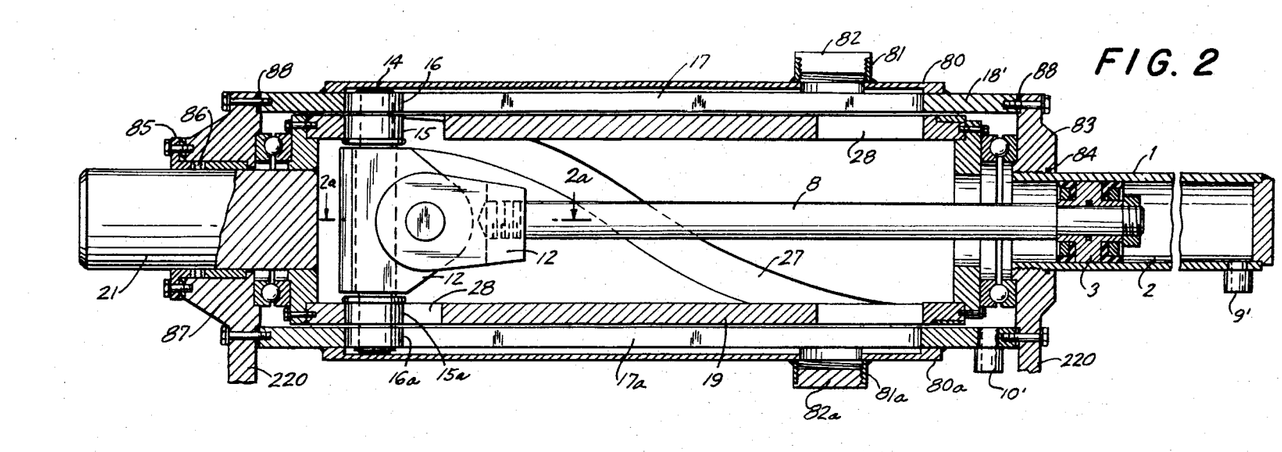
FIG. 2 is an axial sectional view of another hydraulically operated embodiment.
Figure 2A:
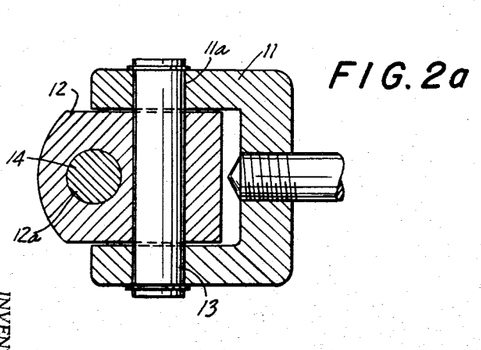
FIG. 2a is a fragmentary sectional view taken on line 2a—2a in FIG. 2.

A clevis 11 is threaded to the end of piston rod 8, and a clevis pin 13 passes through the bores 11a to provide a journal for a head member 12, as also shown in FIG. 2a. A wrist pin 14 extends through a bore 12a in head member 12, laterally projecting from the same. Roller bearings 15 and 16 and 15a, 16a are mounted on adjacent portions of the projecting force-transmitting arms of wrist pin 14 for turning movement.

Thrust roller bearings 25 and 26 respectively abut support plates 22 and 22a, and support a tubular member 19 for turning movement. Tubular member 19 includes two end plates 20 and 20a bolted to the tubular main portion of member 19. An output shaft 21 is welded to end plate 20 so that members 19 and 21 form an integral output member. Output shaft 21 is mounted in a bearing 23 in support plate 22 for turning movement about an axis which coincides with the axis of bearings 25 and 26 and substantially with the axis of piston rod 8.

Tubular member 19 is formed with two or more diametrically opposite guide slots 27 and 28 which are shown to be of helical shape and to extend through 180°. This angle may be made greater or smaller in accordance with the desired turning angle of the output shaft. In the section of FIG. 1, the opposite end portions of guide slots 27 and 28 are located in a common plane passing through the axis of tubular member 19. Ball bearing roller means 15 and 15a are respectively located in the helical slots 27 and 28 and are adapted to roll along the walls of slots 27 and 28. Flanges 15' are provided on the inner ends of roller means 15.

A guide means 18 is secured to support plates 22 and 22a by screws 18a. Guide means 18 has two diametrically opposite straight guide slots 17 and 17a extending parallel to the axis of the tubular member 19, 21. Ball bearing rollers 16 and 16a are respectively located in the straight guide slots 17 and 17a and adapted to roll in the same. It is also possible to provide helical slots in guide means 18, and straight slots in tubular member 19. Piston rod 8, clevis 11, head member 12, pins 13, 14 and roller bearings 15, 16, 15a, 16a constitute an input member.

When the hydraulic operating means are actuated, and piston 3 reciprocates the input member with its force transmitting arm means 14, 15, 16, 15a 16a, rollers 16 and 16a will be guided in the straight slots 17 and 17a so that the input member and hydraulic piston 5 will not turn.

Rollers 15 and 15a move in the same plane, and exert pressure against the walls of the helical slots 27 and 28, causing the tubular member 19 and output shaft 21 to rotate through an angle of 180°. Since roller means 15 and 16 are pressed against opposite surfaces of corresponding correlated slots 27 and 17, and roller means 15a and 16a are pressed against opposite surfaces of slots 28 and 17a, the rollers of each pair of roller means 15 and 16 and roller means 15a and 16a turn in opposite directions of rotation. Due to the fact that particularly rollers 15 and 15a roll along the walls of the helical slots 27, 28, the friction is considerably reduced as compared with motion transforming actuators in which surfaces slide on each other to transmit forces. Since slots 17 are straight, and the force transmitted to the walls of slots 17 and 17a extends perpendicular to the same, non-turnable rectangular slide members may be substituted for roller means 16 and 16a.

It will be noted that only shearing forces act on the end portions of pin 14 between adjacent roller means 15 and 16, so that comparatively small dimensions of the force-transmitting arms are sufficient for transmitting a very great torque. The axial thrust created by the pressure of rollers 15 and 15a on the walls of slots 27 and 28 and acting on the tubular member 19, is taken up by the thrust bearings 25 and 26.

The radial distance between the axis of member 19 and the rollers determines the forces acting on the rollers and pin 14. The greater this radial distance is, the smaller is the force acting on the roller bearings for a given output torque produced by shaft 21. It will be understood that the limiting factor in producing high output torques for a given size of the actuator, is the maximum permissible bearing pressure of the force transmitting means of the actuator.

If the end portions of slots 27, 28 are spaced 180°, as shown in FIG. 1, the helix angle of slots 27 and 28 depends on the ratio between the diameter or circumference of tubular portion 19a, and the axial length of slots 27, 28. If the helix angle is less than 45°, the output force is greater than the input force, whereas in the event that the helix angle is greater than 45°, the output force will be smaller than the input force, assuming that friction losses are not considered.

Since rollers 15 and 16 are positioned adjacent to each other on the end portions of pin 14, pin 14 is not subjected to any substantial bending forces.

In the illustrated embodiment, each helical slot 27, 28 extends through 180° to achieve a turning of the output shaft through 180° for each reciprocating stroke of the input member with its force-transmitting arms. However, the circumferential extension of the helical slots 27 may be modified in accordance with the use to which the motion transforming actuator is put. The output shaft may be turned through any reasonable number of degrees, limited only by the length of piston travel and the steepness of the guide slots 27 and 28.

Figure 8:
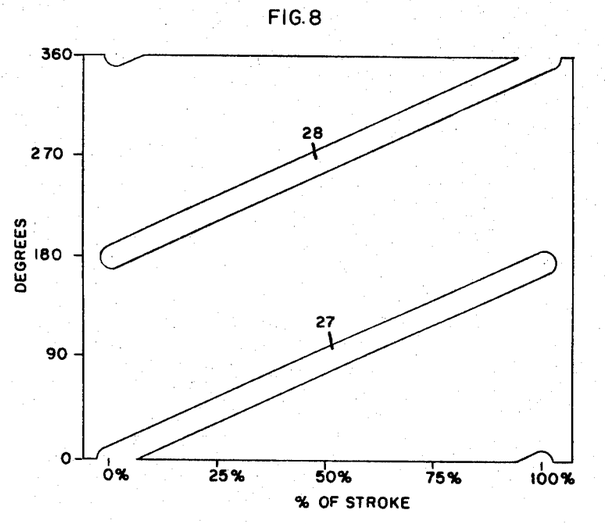
FIG. 8 is a diagrammatic developed view illustrating a helical slot which may be used in an actuator according to the present invention.

FIG. 8 illustrates in a diagrammatic manner tubular member 19 and slots 27, 28 in a developed view. The axial extension of the slots is indicated as 100% corresponding to a full stroke of the input member and the circumference of tubular member 19 extends over 360°. When the input member has moved, for example, 50 percent of its stroke, the output member 21 has turned 90° corresponding to the helix angle of slots 27, 28. It will be seen that a complete stroke of the piston will result in a turning of the output shaft through 180°.

The transmission ratio may consequently be expressed as the angle of rotation of the output member divided by the length of the piston travel.

It will be appreciated that for a helical slot as shown in FIG. 8, the transmission ratio will remain constant, so that the output shaft will produce a constant torque and will turn at constant speed.

Figure 9:
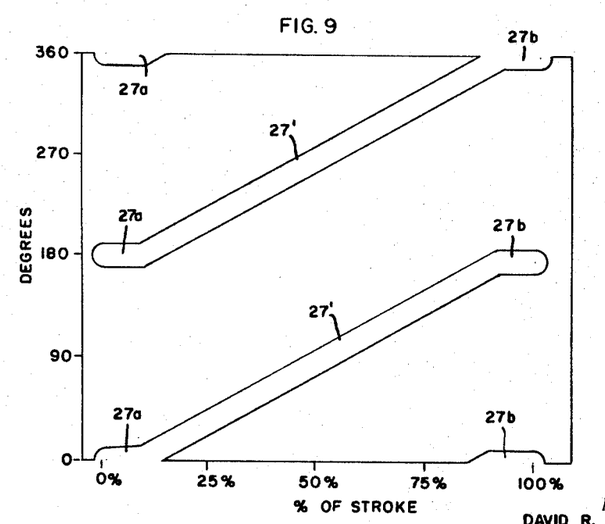
FIG. 9 is a diagrammatic developed view illustrating the construction of a modified helical slot.

FIG. 9 diagrammatically illustrates a modified construction of slots 27 and 28. A slot 27 is shown which has two straight end portions 27a and 27b, and a helical intermediate portion 27'. The slot extends through 180° and consequently, the straight end portions 27a and 27b which extend in axial direction, will register with the straight slots 17 and 17a in the two end positions of the output member. In the intermediate positions of the output member the helical slot portion 27' will cross the straight axially extending slots 17 and 17a with the force transmitting arms 14, 15 and 16 passing through the crossing portions of slots 27 and 17.

When the force transmitting arms are located in the straight slot end portions 27a, 27b, and in straight slots 17 and 17a, no turning moment is transmitted to the rotary output member during the corresponding axial movement of the reciprocating input member. On the other hand, a load torque acting on the output member and acting to turn the same back to its former position, will be unable to turn the output member back since no turning moment can be exerted while the force transmitting arms are located in the straight slot end portions 27a and 27b. Consequently, the actuator is automatically locked in the end positions of the input member and output member. Assuming a substantial helix angle of slot portions 27', a load torque acting on the output member will move the input member in axial direction while the rollers are located in slot portions 27', since only small helix angles, as used for screw threads, are self-locking.

Figure 10:
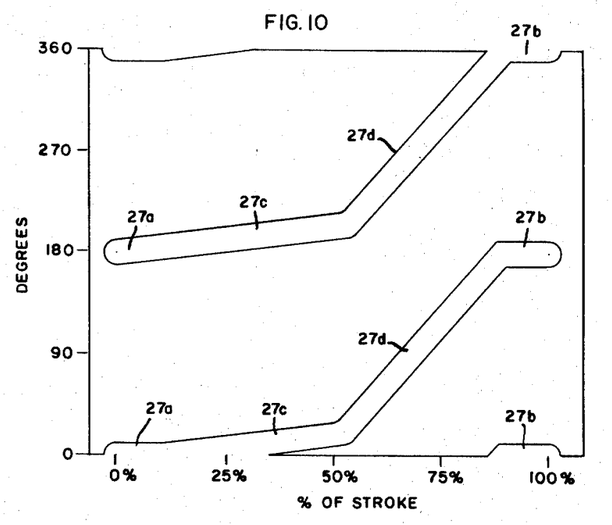
FIG. 10 is a diagrammatic developed view illustrating a further modified construction of the helical slot.

FIG. 10 illustrates another modified slot construction of the output member. A slot includes again two straight axially extending end portions 27a and 27b having the above-explained effect, but the intermediate helical slot portion is composed of two helical slot portions 27c and 27d which have different helix angles. Due to the smaller helix angle of helical slot portion 27c, a greater output torque will be produced during the first half of the stroke of the piston and input member while the output shaft rotates at a comparatively slow rotary speed.

During the second part of the reciprocating stroke of the input member, a smaller output torque is produced but the output member rotates at a greater rotary speed. This is a very great advantage where a variation of the transmission ratio is desired in accordance with a corresponding load variation.

Figure 11:
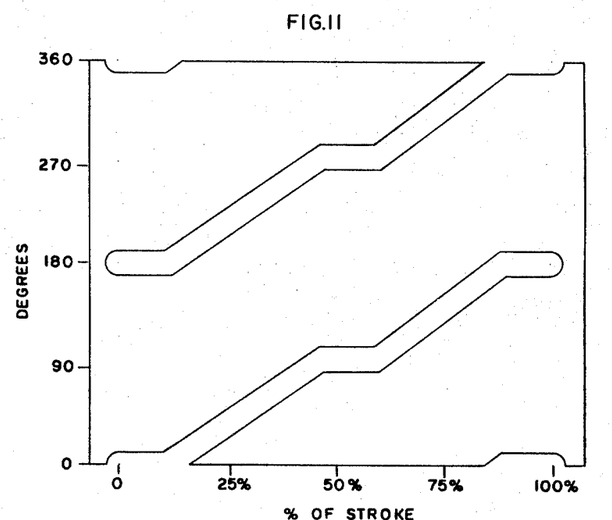
FIG. 11 is a diagrammatic developed view illustrating another construttion of the helical slot.

In the modified slot construction illustrated in FIG. 11, two straight end portions 27a and 27b are provided, and in addition thereto, a third straight axially extending slot portion 27g is placed at the center of the slot in the output member. The straight slot portions are connected by intermediate helical slot portions 27e and 27f which have the same helix angle. The slot construction illustrated in FIG. 11 will cause stopping of the rotation of the output member at the middle of the piston stroke, and turning of the output member at constant speed with constant torque until the end positions are reached in which the output member will be locked by the straight slot end portions 27a and 27b against being turned by the load.

It will be understood that the slot portions 27e and 27f may be constructed to have different helix angles to produce different output torques in accordance with the prevailing load conditions.

In the embodiment of FIG. 1, the guide means 18 may be a cylindrical element provided with straight axial slots 17 and 17a, or may consist of two opposite plates having straight guide slots 17 and 17a. The interior of tubular member 19 opens through the helical and straight slots to the outside. However, an outer casing of cylindrical configuration may be secured to the support plates 22 and 22a spaced from the end faces of pins 14 of the force transmitting arms of the input member.

Figure 12:
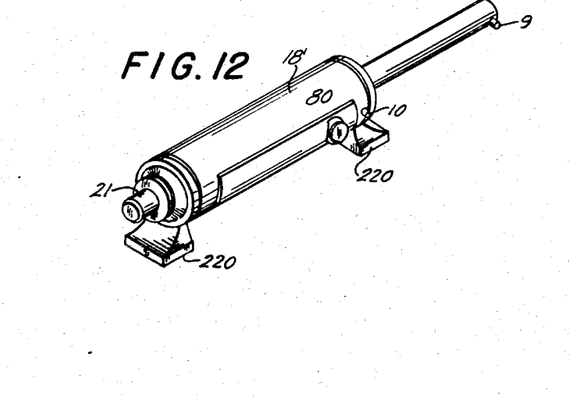
FIG. 12 is a perspective view illustrating a motion transforming hydraulic actuator according to the invention.

The modified embodiment of FIG. 12 is constructed in the same manner as the above described embodiment of FIG. 1 as far as the motion transforming principle according to the present invention is concerned, and consequently corresponding parts are indicated by like numerals, and modified parts are indicated by primed numerals in FIGS. 1 and 2.

Member 18' which is fixed to support plates 83 and 87 is of cylindrical shape and has straight guide slots 17 and 17a. Each guide slot 17 and 17a is covered by a closure plate 80 and 80a, respectively. Packings 86 seal the bearing in support plate 87 with the aid of a stuffing box 85, and packings 88 seal the surfaces on which member 18' abuts support plates 83 and 87. The thus formed closed shell is provided with ports 81, 81a closed by threaded plugs 82, 82a.

Hydraulic cylinder 1 is secured to support plate 83 and sealed by a sealing ring 84. The cylinder portion on the left side of piston 3 communicates with the chamber formed within the closed outer member 18', 87, 83, 80, 80' and in addition to a port 9', a port 10' is provided in member 18' so that pressure fluid fills the entire actuator. Admission of pressure fluid through port 10' will cause piston 3 to travel to the right in cylinder 1, whereby roller means 15 and 15a will roll along slots 27 and 28 to turn the output member 19 and output shaft 21. Admission of pressure fluid through port 9' will cause opposite rotation of output shaft 21 through 180°.

FIG. 12 illustrates the outer appearance of an actuator according to the present invention, substantially corresponding to the embodiment of FIG. 2 with certain modifications. In the embodiment of FIG. 12, the slots 17 and 17a are closed by closure plates 80, as described with reference to FIG. 2. It will be appreciated that closure plates 80 and 80a may also be provided in the embodiment of FIG. 1, to protect the interior of the actuator from dust or water.

Air or oil may be used in cylinder 1 for operating the piston 2, but oil is particularly advantageous in the embodiment of FIG. 2 since all force-transmitting parts are permitted to run in oil.

Figure 2B:
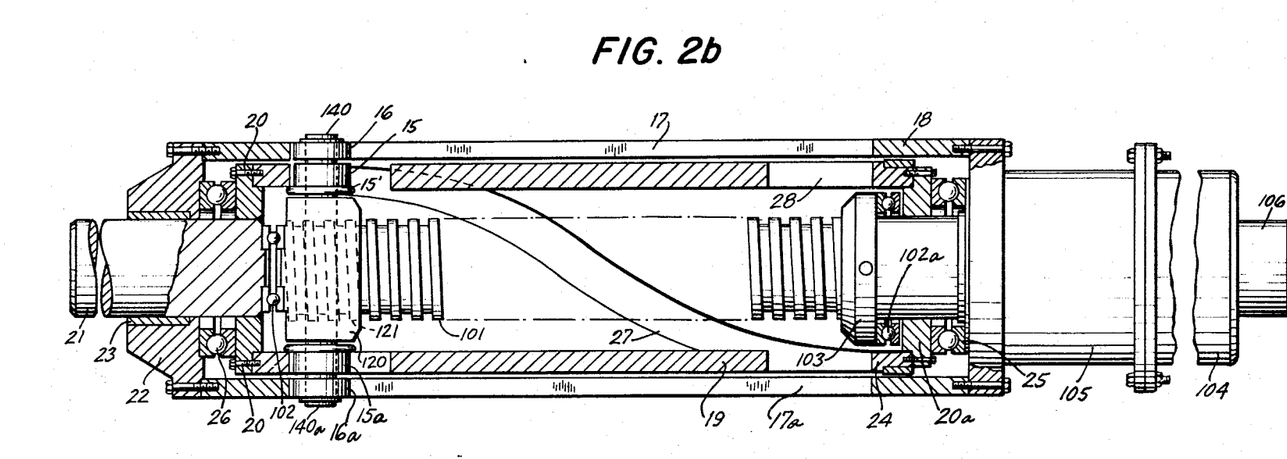
FIG. 2b is an axial sectional view of a further embodiment in which the actuator is operated by an electric motor.

In the modified embodiment of the invention illustrated in FIG. 2b, an electric motor is used instead of a hydraulic motor. The structure for transforming a rectilinear motion into a rotary motion is the same as described with reference to FIGS. 1 and 2, and consequently corresponding parts are designated by like reference numerals in FIGS. 1, 2, and 2b.

Roller means 15, 15a and 16, 16a are mounted on force-transmitting arms 140, 140a of a head member 120 which has an inner threaded bore 121 in threaded engagement with a threaded member or spindle 101, one end of which abuts a thrust roller bearing 102 mounted on the inner end face of output shaft portion 21. The other end of spindle 101 has a fixed flange 103 abutting a thrust roller bearing 102a mounted on end plate 20a of tubular member 19.

A constant speed motor 104 drives spindle 101 through a reduction gear transmission 105.

Rotation of spindle 101 causes movement of the force-transmitting means 120, 14, 15, 16, 15a, 16a in axial direction of the spindle so that tubular member 19 is rotated with output shaft 21 while roller means 15, 15a move along helical slots 27, 28 and roller means 16, 16a move in the straight slots 17, 17a of guide member 18. Motor 104 is reversible so that spindle 101 reciprocates head 120 causing turning of output shaft 21 in opposite directions. By selecting the ratio of transmission 105, and the lead of spindle 101, the turning speed of the output shaft can be determined.

A maximum torque switch 106 is connected into the circuit of motor 104. A flexible coupling (not shown) in the transmission 105 between spindle 101 and motor 104 includes two parts which are angularly displaced relative to each other by the transmitted torque, and when a maximum torque is exceeded, the displacement is sufficient to trip switch 106 so that the motor is de-energized.

The slot constructions shown in FIGS. 9–11 may be used interchangeably in the embodiments of FIGS. 1, 2, 2b and 12, depending on the purpose for which the actuator is used.

A motion transmitting actuator as above described is particularly advantageously used in combination with folding hatch covers for closing the hatches of ships. The simplicity of construction, ease of installation, and the possibility of influencing the torque by selecting suitable slot angles, together with the advantage of positively controlled motions make the actuator particularly suitable and desirable for the operation of folding hatch covers.

Figure 3:
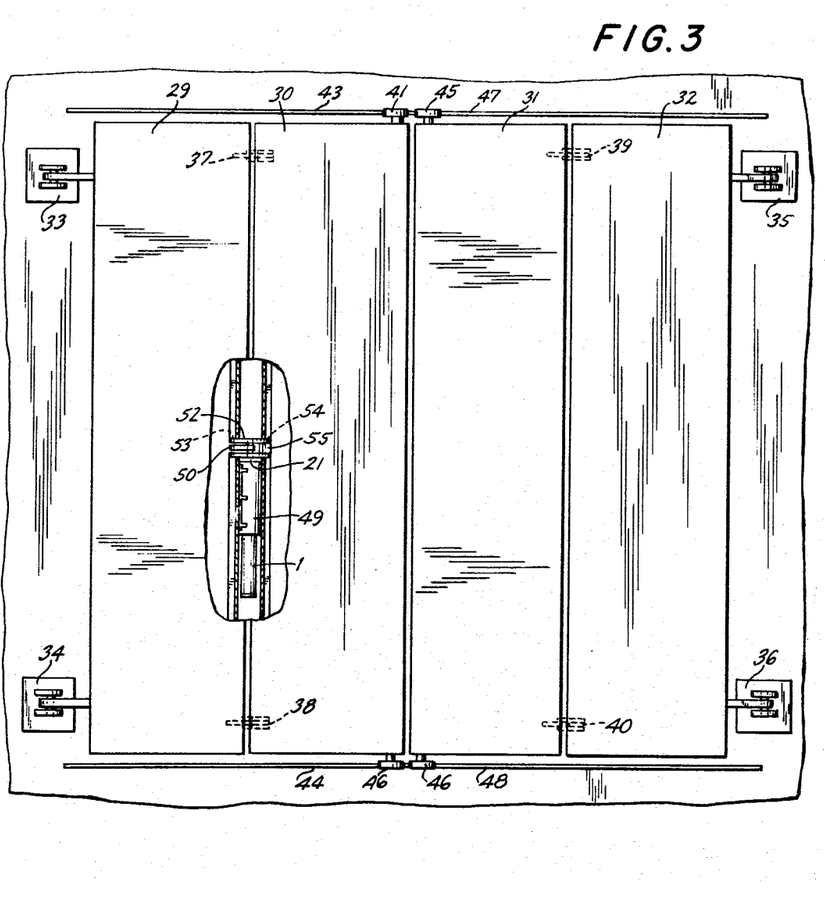
FIG. 3 is a plan view, partially broken off, and illustrating a hatch cover actuating arrangement according to one embodiment of the invention.
Figure 4:
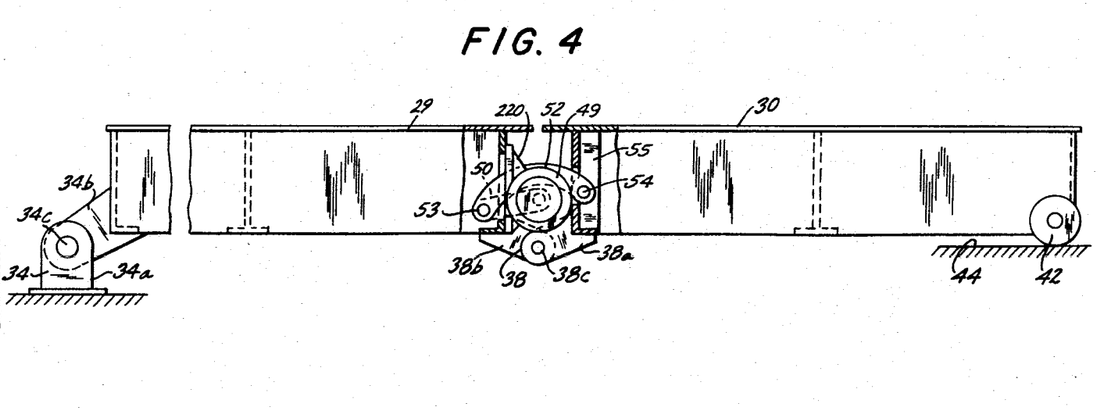
FIG. 4 is a side elevation, partly in section, of the hatch cover actuating arrangement shown in FIG. 3 in the horizontal hatch closing position.
Figure 5:
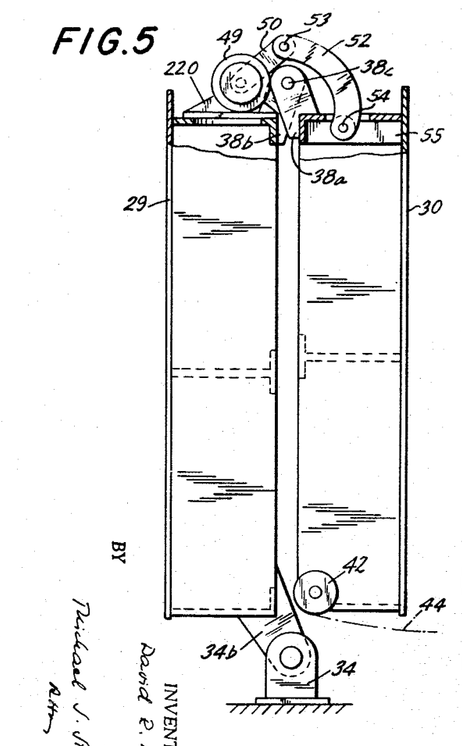
FIG. 5 is a side elevation of the embodiment of FIGS. 3 and 4 and illustrating the folded position of the hatch cover sections.

Referring to the embodiment of FIGS. 3, 4 and 5, FIG. 3 shows a hatch cover comprising two hatch cover means, each of which includes a pair of hatch cover sections 29, 30, and 31, 32. Hatch cover section 29 is mounted on the deck of the ship on a pair of pivot means 33, 34 for turning movement about a horizontal axis. Hatch cover sections 29 and 30 are connected to each other by hinge means 37, 38. As best seen in FIG. 4, hinge means 38 comprises two arms 38a and 38b respectively secured to hatch cover sections 29 and 30 and connected by hinge pin 38c. Hinge 37 is correspondingly constructed, and has a hinge pin coaxial with hinge pin 38c. The pivot means 34 includes a support 34a, an arm 34b secured to panel 29, and a pivot pin 34c. The pivot pin of pivot means 33 is coaxial with pivot pin 34c. Hatch cover sections 31 and 32 are connected by hinge means 39 and 40 corresponding to hinge means 37 and 38. Hatch cover section 32 is supported on pivot means 35 and 36 corresponding to pivot means 33 and 34. Each pair of hingedly connected hatch cover sections has a normal horizontal position shown in FIG. 4, and a substantially vertical folded position shown in FIG. 5. Hatch cover section 30 has a pair of rollers or wheels 41 and 42, and hatch cover section 31 has a pair of rollers 45 and 46. When the hatch cover sections are moved from the flat horizontal position shown in FIG. 4 to the folded position shown in FIG. 5, rollers 41 and 42 roll on corresponding tracks 43 and 44 provided on the deck. Wheel or rollers 45, 46 on section 31 roll on tracks 47 and 48.

Each pair of hatch cover sections 29, 30, and 31, 32 is operated by a motion transforming actuator in accordance with the present invention, the actuator being shown only for the pair of sections 29 and 30.

The actuator is indicated by reference numeral 49 and has supporting brackets 220 secured to hatch cover section 29. In the position of FIG. 4 the axis of output shaft 21 is located in a vertical plane passing through the axis of hinge pins 38c. However, in a modified construction the actuator 49 may be placed within the hollow hatch cover section 29.

An arm 50 is fixed to output shaft 21 of actuator 49, and is pivotally connected by pivot pin 53 to one pair of ends of a pair of links 52 whose other ends are connected by a pivot pin 54 to a bracket 55 fixed on hatch cover section 30.

When pressure fluid is admitted into cylinder 1, as described with reference to FIGS. 1 and 2, or the motor 104 of FIG. 2b started, output shaft 21 is turned with arm 50 through 180° and transmits this motion to links 52 which urge hatch cover section 30 to turn in clockwise direction as viewed in FIG. 4. During turning movement of output shaft 21 through 180°, each hatch cover section 29 and 30 will turn through 90° until the hatch cover sections are substantially vertical and assume the folded positon shown in FIG. 5.

The load torque acting on output shaft 21 is greatest in the moment in which hatch cover sections 29, 30 move out of the completely horizontal position shown in FIG. 4, and is smallest in the region of the folded position shown in FIG. 5. The linkage 50, 52 is designed to produce a greater torque at the beginning of the turning movement of output shaft 21 than at the end of the turning movement of the output shaft. Due to the small angle between arm 50 and link 52 in the positon of FIG. 4, the greatest amount of pushing force is transmitted by links 52. However, even more favorable conditions are obtained when the helical slots of the output member of the actuator are constructed as described with reference to FIG. 10, in which the output shaft produces a greater torque during the first part of its turning movement than during the second part of the turning movement.

Since the greatest torque is available at the beginning of the hatch opening operation, sufficient initial torque is provided to start the movement of the heavy hatch cover sections out of the horizontal position closing the hatch. As the sections approach the folded position, and less torque is required, the torque provided by the actuator, and also the torque transmitted by the linkage 50, 52 are reduced which is desired since the load torque is also reduced.

By selecting the helix angle of the slots 27, 28, the actuator can be adapted to the torque variation of a specific hatch cover arrangement, and a comparatively small hydraulic motor is sufficient for operating the hatch covers as compared with conventional arrangements in which hydraulic servo-motors are used for directly operating the hatch covers through a linkage.

The slots of the output member of the actuator are preferably provided with a straight end portion 27a and 27b described with reference to FIGS. 9, 10 and 11. The straight slot end portions prevent the transmission of power between the output and input members, so that the hatch cover sections are locked in the two end positions shown in FIGS. 4 and 5.

This is of particular advantage for hatch covers used on ships, since no unauthorized person can raise the hatch cover sections without operating the hydraulic system which may be locked in a suitable manner. It is impossible to turn the output shaft 21 since this would require turning of the fixedly mounted guide means in which the straight slots 17 and 17a are provided.

On the other hand, when the covers are folded, and are inadvertently turned to a somewhat more open position, the hatch cover section may start rolling on the tracks toward the horizontal flat position thereof, since the weight of the hatch cover section will tend to move the hatch cover to this position.

When the actuator according to the present invention with straight end portions of the helical slots is used, the hatch cover sections are locked in the folded position, and the load torque provided by the weight of the hatch cover sections is incapable of turning the output member which is locked to the fixed member 18 or 18'.

Another advantage of this construction is that in an arrangement as shown in FIG. 3 where two pairs of hingedly connected hatch cover sections are provided for covering a single hatch opening, one pair of hatch cover sections will remain locked while the other hatch cover section is operated by folding or unfolding the same.

Figure 6:
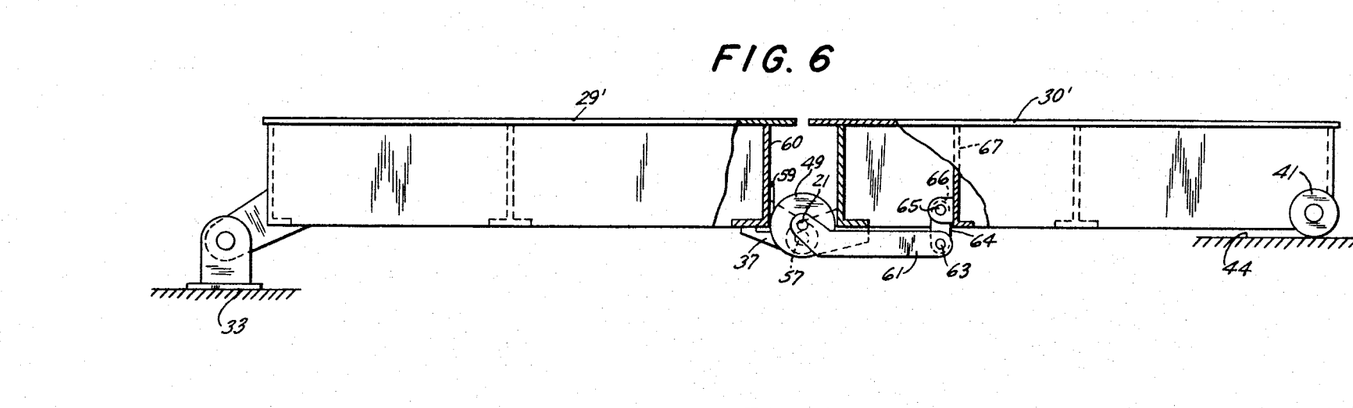
FIG. 6 is a side elevation illustrating another embodiment of a hatch cover actuating arrangement according to the invention.

FIG. 6 illustrates another construction of a hatch cover in accordance with the present invention. Hatch cover sections 29' and 30' are connected by hinge means 37 including hinge pins 57. Actuator 49 is secured to section 29, and more particularly to a wall portion 60 thereof by supporting brackets 59. A torque arm 61 is fixed on the output shaft 21 of the actuator whose axis is parallel to the hinge axis of hinge pins 57 and located in a vertical plane passing through the hinge axis in the position of FIG. 6. At the end of torque arm 61, a pivot pin 63 is provided which is connected to a link 64 whose other end is connected by a pivot pin 65 to a bracket 66 on a wall portion 67 of hatch cover section 30'. When torque arm 61 is turned by output shaft 21, it tends to rotate hatch cover section 30' clockwise about rollers 41, 42 so that the adjacent portions of hatch cover sections 29', 30' are raised while turning relative to each other about hinge pins 57 whereby the hinge pins 57 are caused to rise with the two hatch cover sections. Link 64 will turn in accordance with a displacement of torque arm 61 which is possible since the hinge axis and the axis of output shaft 21 are spaced from each other. The linkage provides the greatest torque at the start of the movement of the hatch cover sections out of the horizontal position illustrated in FIG. 6, and if helical slots having different helix angles are used in the actuator, optimal torque conditions result.

Figure 7:
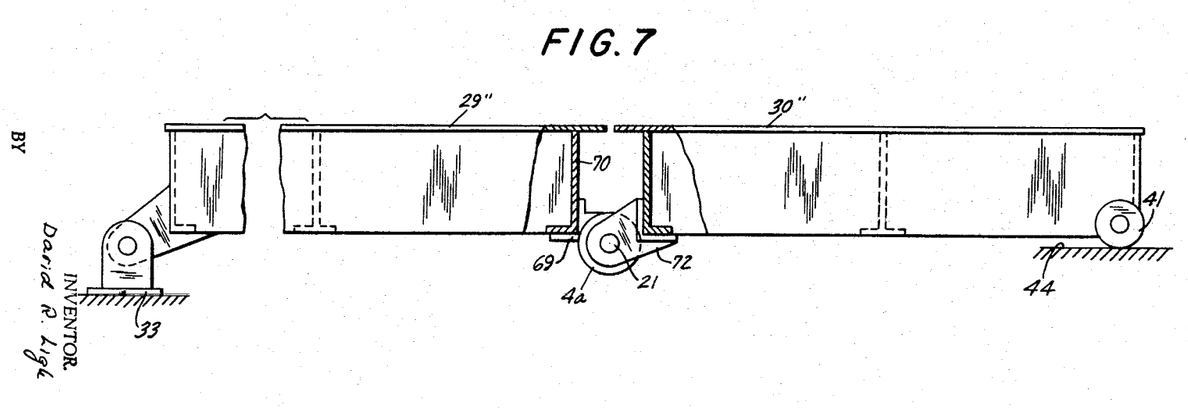
FIG. 7 is a side elevation illustrating a further embodiment of the hatch cover actuating arrangement according to the invention.

FIG. 7 illustrates another embodiment of the invention in which the hatch cover sections 29" and 30" are connected by hinge means as described with reference to FIGS. 3 to 6. However, in the embodiment of FIG. 7, the actuator 49 is mounted on a bracket 69 on wall 70 of section 29" in such a position that the axis of the output shaft 21 coincides with the hinge axis of pins 57 of the hinge means 37, not shown in FIG. 7. An arm 72 is fixedly secured to output shaft 21, and also to a wall of hatch cover section 30" so that the same is turned out of the flat horizontal position when output shaft 21 is turned. The hinge means 37, 57 may also be omitted in the embodiment of FIG. 7, and the two hatch cover sections 29" and 30" only connected by one or two actuators in accordance with the present invention as shown in FIG. 7. The construction of FIG. 7 requires the smallest number of parts, and is very easy to install and to remove for the purpose of repair or displacement. The required higher torque at the beginning of the folding operation can be provided by shaping the helical slots in accordance with FIG. 10, and the straight end portions 27a and 27b of the helical slots are advantageously provided for locking the hatch cover sections in the flat and folded positions, as required by the Rules of the U.S. Coast Guard in order to prevent an accidental falling of the hatch cover when the hydraulic system fails. Tandem actuators may be made in accordance with modification of the invention where the cylinders 1 shown in FIGS. 1 and 2 are connected at their right end portions to actuators arranged symmetrically to the actuators shown in FIGS. 1 and 2, a second piston rod 8 being secured to piston 3. Reciprocation of piston 3 will cause the opposite output shafts of the tandem constructions to rotate in the same direction through the same angle if the helical slots are correspondingly shaped. A tandem construction of this type may be advantageously used in the embodiment of FIG. 7.

By selecting the proportions of the cylinder diameter, hydraulic pressure, and length of stroke, the reciprocating operating force can be determined. By suitably choosing the helix angle and configuration of the slots in the rotary output member, the desired output torque and rotary speed of the output shaft can be achieved.

It will be understood that each of the elements described above, or two or more together, may also find a useful application in other types of hatch cover actuating arrangements differing from the types described above.

While the invention has been illustrated and described as embodied in a motion transforming actuator producing a varying output torque and being locked in two end positions angularly spaced 180° from each other, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An actuator comprising, in combination, a first hollow member having guide slot means, said guide slot means including straight end portions and a helical intermediate portion; a second member partly located in said first hollow member and including force-transmitting means guided in said guide slot means, said force-transmitting means having a portion projecting out of said guide slot means; support means having straight guide means partly registering with said straight end portions for engaging and guiding said portion of said force-transmitting means, said support means supporting one of said members for turning movement about an axis and the other member for rectilinear movement in the direction of said axis; and operating means for moving one of said members relative to said support means whereby the respective other member is actuated and moves relative to said support means.

2. An actuator, comprising in combination, a first hollow member having at least partly helical guide slot means, said guide slot means including helical portions having different helix angles; a second member partly located in said first hollow member and including force-transmitting means guided in said guide slot means, said force-transmitting means having a portion projecting out of said guide slot means; support means having straight guide means for engaging and guiding said portion of said force-transmitting means, said support means supporting one of said members for turning movement about an axis and the other member for rectilinear movement in the direction of said axis; and operating means for moving one of said members relative to said support means whereby the respective other member is actuated and moves relative to said support means.

3. An actuator comprising, in combination, support means; an output member mounted on said support and including a tubular portion formed with first slots having straight end portions and a helical intermediate portion, and an output shaft projecting from said tubular portion coaxial with the same, said shaft and tubular member being supported on said support means for turning movement about the axis of said output shaft; a guide member fixed on said support means disposed outwardly of said output member and having second straight slots parallel to said axis crossing said helical intermediate portions and registering with said end portions of said first slots, respectively; an input member having a head located in said tubular member, a rod connected to said head and projecting out of said tubular member, and a plurality of force-transmitting arms radially projecting from said head and through crossing portions of said first and second slots and engaging the same; and operating means connected to said rod for reciprocating said input member in the direction of said axis and of said second slots so that said force-transmitting arms press against said first slots and effect a turning movement of said output member.

4. An actuator comprising, in combination, support means; an output member mounted on said support and including a tubular portion formed with first slots having straight end portions and two helical intermediate portions having different pitch angles, and an output shaft projecting from siad tubular portion coaxial with the same, said shaft and tubular member being supported on said support means for turning movement about the axis of said output shaft; a guide member fixed on said support means disposed outwardly of said output member and having second straight slots parallel to said axis crossing said helical intermediate portions and registering with said end portions of said first slots, respectively; an input member having a head located in said tubular member, a rod connected to said head and projecting out of said tubular member, and a plurality of force-transmitting arms radially projecting from said head and through crossing portions of said first and second slots and engaging the same; and operating means connected to said rod for reciprocating said input member in the direction of said axis and of said second slots so that said force-transmitting arms press against said first slots and effect a turning movement of said output member.

5. An actuator comprising, in combination, support means; an output member mounted on said support and including a tubular portion formed with first slots including helical portions having different helix angles and an output shaft projecting from said tubular portion coaxial with the same, said shaft and tubular member being supported on said support means for turning movement about the axis of said output shaft; a guide member fixed on said support means disposed outwardly of said outuut member and having second straight slots parallel to said axis and crossing said first slots, respectively; an input member having a head located in said tubular member, a rod connected to said head and projecting out of said tubular member, and a plurality of force-transmitting arms radially projecting from said head, and through crossing portions of said first and second slots and engaging the same; and operating means connected to said rod for reciprocating said input member in the direction of said axis and of said second slots so that said force-transmitting arms press against said first slots and effect a turning movement of said output member.

6. An actuator comprising, in combination, support means; an output member mounted on said support and including a tubular portion formed with first slots having straight end portions, a straight center portion, and helical portions intermediate said straight portions, and an output shaft projecting from said tubular portion coaxial with the same, said shaft and tubular member being supported on said support means for turning movement about the axis of said output shaft; a guide member fixed on said support means disposed outwardly of said output member and having second straight slots parallel to said axis crossing said helical portions and registering with said straight portions of said first slots, respectively; an input member having a head located in said tubular member, a rod connected to said head and projecting out of said tubular member, and a plurality of force-transmitting arms radially projecting from said head and through crossing portions of said first and second slots and engaging the same; and operating means connected to said rod for reciprocating said input member in the direction of said axis and of said second slots so that said force-transmitting arms press against said first slots and effect a turning movement of said output member.

7. An actuator comprising, in combination, a turnable first member having an axis and at least partly helical slots including slot portions having different helix angles; a guide member adjacent said first member and having straight slots crossing said helical slots; support means fixedly supporting said guide member and turnably supporting said first member; a second member having force-transmitting arms radially projecting through crossing portions of said helical and straight slots and engaging said slots with radially adjacent portions; and operating means for reciprocating said second member in the direction of said straight slots whereby said first member is turned by said force-transmitting arms.

8. An actuator comprising, in combination, a turnable first member having an axis and at least partly helical slots and straight slot end portions parallel to said axis; a guide member adjacent said first member and having straight slots crossing said helical slots and adapted to register with said straight slot end portions; support means fixedly supporting said guide member and turnably supporting said first member; a second member having force-transmitting arms radially projecting through crossing portions of said helical and straight slots and through said slot end portions and engaging said slots with radially adjacent portions; and operating means for reciprocating said second member in the direction of said straight slots whereby said first member is turned by said force-transmitting arms.

9. An actuator comprising, in combination, a turnable first member having an axis and at least partly helical slots including slot portions having different helix angles, and straight slot end portions parallel to said axis; a guide member adjacent said first member and having straight slots crossing said helical slots and adapted to register with said straight slot end portions; support means fixedly supporting said guide member and turnably supporting said first member; a second member having force-transmitting arms radially projecting through crossing portions of said helical and straight slots and through said slot end portions and engaging said slots with radially adjacent portions; and operating means for reciprocating said second member in the direction of said straight slots whereby said first member is turned by said force-transmitting arms.

10. A hatch cover actuating arrangement comprising two hatch cover sections connected for relative turning movement about a first horizontal axis between a horizontal position and a substantially vertical folded position; pivot means supporting the free end of one section for turning movement about a second parallel horizontal axis; horizontal track means supporting the free end of the other section for movement during turning of said sections; a support mounted on one of said sections; an output member mounted on said support for turning movement and including a tubular portion formed with at least partly helical guide slot means including a first slot portion having a smaller helix angle and a second slot portion having a greater helix angle, and an output shaft operatively connected to the other section for turning the same; an input member partly located in said tubular portion and including force transmitting arms guided in said guide slot means and having end portions projecting out of said guide slot means, said input member being mounted on said support for rectilinear movement; straight guide means fixedly mounted on said support extending parallel to said axes and engaging and guiding said end portions of said force-transmitting arms; an operating means for reciprocating said input member whereby said force-transmitting arms effect turning of said output shaft so that said hatch cover sections are turned relative to each other between said horizontal and folded positions while due to the different helix angles of said slot portion a greater torque is applied by said output shaft to said other section in said horizontal position than during movement toward said folded position.

11. A hatch cover actuating arrangement comprising two hatch cover sections connected for relative turning movement about a first horizontal axis between a horizontal position and a substantially vertical folded position; pivot means supporting the free end of one section for turning movement about a second parallel horizontal axis; horizontal track means supporting the free end of the other section for movement during turning of said sections; a support mounted on one of said sections; an output member mounted on said support for turning movement and including a tubular portion formed with at least partly helical guide slot means, and an output shaft operatively connected to the other section for turning the same, said guide slot means including straight end portions parallel to said shaft; an input member partly located in said tubular portion and including force-transmitting arms guided in said guide slot means and having end portions projecting out of said guide slot means, said input member being mounted on said support for rectilinear movement; straight guide means fixedly mounted on said support extending parallel to said axes registering with said straight end portions of said guide slot means in said horizontal and folded positions and engaging and guiding said end portions of said force-transmitting arms; and operating means for reciprocating said input member whereby said force-transmitting arms effect turning of said output shaft so that said hatch cover sections are turned relative to each other between said horizontal and folded positions, said hatch cover sections being locked in said horizontal and folded positions when said force transmitting arms are located in said straight end portions of said guide slots.

12. A hatch cover actuating arrangement comprising two hatch cover sections connected for relative turning movement about a first horizontal axis between a horizontal position and a substantially vertical folded position; pivot means supporting the free end of one section for turning movement about a second parallel horizontal axis; horizontal track means supporting the free end of the other section for movement during turning of said sections; a support mounted on one of said sections; a first member having a third horizontal axis and at least partly helical slots and including an output shaft supported on said support for turning movement and operatively connected with the other section for turning the same; a second member adjacent said first member and having straight slots crossing said helical slots, said second member being fixedly supported on said support; a third member mounted on said support for horizontal rectilinear movement in the direction of said third axis and having force-transmitting arms radially projecting through crossing portions of said helical and straight slots and engaging said slots with radially adjacent portions; and operating means for reciprocating said third member in the direction of said third axis and said straight slots whereby said force-transmitting arms effect turning of said output shaft so that said hatch cover sections are turned relative to each other between said horizontal and folded position, said helical slots including a first slot portion having a smaller helix angle and a second slot portion having a greater helix angle whereby a greater torque is applied by said output shaft to said other section in said horizontal position than during the second part of the movement toward said folded position.

13. A hatch cover actuating arrangement comprising two hatch cover sections connected for relative turning movement about a first horizontal axis between a horizontal position and a substantially vertical folded position; pivot means supporting the free end of one section for turning movement about a second parallel horizontal axis; horizontal track means supporting the free end of the other section for movement during turning of said sections; a support mounted on one of said sections; a first member having a third horizontal axis and at least partly helical slots and including an output shaft supported on said support for turning movement and operatively connected with the other section for turning the same; a second member adjacent said first member and having straight slots crossing said helical slots, said second member being fixedly supported on said support; a third member mounted on said support for horizontal rectilinear movement in the direction of said third axis and having force-transmitting arms radially projecting through crossing portions of said helical and straight slots and engaging said slots with radially adjacent portions; and operating means for reciprocating said third member in the direction of said third axis and said straight slots whereby said force-transmitting arms effect turning of said output shaft so that said hatch cover sections are turned relative to each other between said horizontal and folded positions, said helical slots having straight end portions registering with said straight slots in said horizontal and folded positions so that said sections are locked in said positions.

14. An actuator comprising, in combination, a first member having first guide means including at least two helical guide portions having a common helix axis and extending at different angles to said common helix axis; a second member including force-transmitting means having a first part guided on said first guide means and a second part; support means supporting said first member for turning movement about an axis, and said second member for rectilinear movement in the direction of said axis, said support means having second guide means for engaging and guiding said second part of said force-transmitting means, said second guide means being straight and parallel to said axis; and operating means for moving said second member relative to said support means whereby said first member turns at different rotary speeds while said two guide portions are respectively engaged by said force-transmitting means.

15. An actuator according to claim 14, in combination with a hatch cover comprising a pair of hatch cover sections connected for relative turning movement about a first horizontal axis between a horizontal end position and a substantially vertical folded end position, pivot means supporting a free end of one section for turning movement about a second parallel horizontal axis, and horizontal track means supporting the free end of the other section for movement during turning of said sections; wherein said support means is secured to one of said sections; and wherein said first member is operatively connected with the other section so that said sections are turned relative to each other between said horizontal and folded positions.

16. An actuator according to claim 15, wherein said two guide portions are helical portions having different helix angles arranged and constructed so that said first member turns said sections with a greater torque out of said horizontal position, and with a smaller torque near said vertical folded position.

17. An actuator according to claim 16, wherein said first guide means includes two straight end portions parallel to said axes for blocking turning movement of said sections in said end positions.

18. An actuator according to claim 15, wherein said first guide means includes at least one straight end portion parallel to said axes for blocking turning movement of said sections in one end position.

19. In combination with a hatch cover comprising a pair of hatch cover sections connected for relative turning movement about a first horizontal axis between a horizontal end position and a substantially vertical folded end position, hinge means supporting a free end of one section for turning movement about the second parallel horizontal axis, and horizontal track means supporting the free end of the other section for movement during turning of said sections; an actuator comprising a first member having guide means including at least two helical guide portions extending at an angle to each other, said first member including an arm having a pivot means at the end thereof; a link having one end pivotally connected with one of said sections and the other end mounted on said pivot means for connecting said first member with said one section; a second member including force-transmitting means having a first part guided on said first guide means and a second part; support means supporting said first member for turning movement about an axis, and said second member for rectilinear movement in the direction of said axis, said support means having second guide means for engaging and guiding said second part of said force-transmitting means and being straight and parallel to said axis, said support means being secured to the respective other section of said hatch cover; and operating means for moving said second member relative to said support means whereby said first member turns at different rotary speeds while said two guide portions are respectively engaged by said force-transmitting means so that said sections are turned relative to each other between said horizontal and folded positions.

20. An actuator according to claim 19, wherein said arm extends toward said one section, and said pivot means is located adjacent said one section.

21. An actuator according to claim 19, wherein said arm extends toward said other section, and wherein the ends of said link are respectively located in the region of said two sections.

22. An actuator according to claim 19, wherein said axis of said turnable first member is parallel to said first axis and is located in a vertical plane passing through said first horizontal axis.

23. An actuator, comprising, in combination, support means, a first member mounted on said support means for turning movement about an axis, and having first guide means including two guide portions, one of said guide portions being helical and the other guide portion being a straight end portion parallel to said axis, a second member mounted on said support means for movement in the direction of said axis, and including force-transmitting means having a first part guided on said first guide means, and a second part; said support means having second guide means for engaging and guiding said second part of said force-transmitting means, said second guide means being straight and parallel to said axis; and operating means for moving one of said members relative to said support means whereby the position of the respective other member relative to said support means is differently influenced while said two guide portions are respectively engaged by said force-transmitting means so that turning of said first member is blocked when said force-transmitting means are located in said end portion.

24. An actuator, comprising, in combination, support means, a first member mounted on said support means for turning movement about an axis, and having first guide means including two helical portions having different helix angles; a second member mounted on said support means for movement in the direction of said axis, and including force-transmitting means having a first part guided on said first guide means, and a second part; said support means having second guide means for engaging and guiding said second part of said force-transmitting means, said second guide means being straight and parallel to said axis; and operating means for moving one of said members relative to said support means whereby the position of the respective other member relative to said support means is differently influenced while said two helical portions are respectively engaged by said force-transmitting means so that said first member turns at different speeds and exerts different torques while said force transmitting means is located in said two helical guide portions, respectively.

25. An actuator according to claim 24, wherein said first guide means includes two end portions which are straight and parallel to said axis so that turning of said first member is blocked when said force-transmitting means are located in said end portions.

26. An actuator according to claim 24, wherein said first member is mounted for turning movement, wherein said second guide means is straight and parallel to said axis; and wherein said first guide means include two end portions which are straight and parallel to said axis, and an intermediate guide portion connecting said helical guide portions, and being straight and parallel to said axis so that turning of said first members is blocked when said force-transmitting means are located in one of said straight portions.

27. An actuator according to claim 24, wherein said operating means include hydraulic cylinder and piston means mounted on said support means, and having a reciprocable element connected with said one member for reciprocating the same.

28. An actuator according to claim 24, wherein said operating means include an electric motor mounted on said support means, a spindle rotated by said motor, and a nut on said spindle secured to said other element.

References Cited

UNITED STATES PATENTS

| | | | |
|---|---|---|---|
| 353,134 | 11/1886 | Hands et al. | 74—89 |
| 763,133 | 6/1904 | Wheeler | 92—31 X |
| 1,801,633 | 4/1931 | Mac Kindy | 92—31 |
| 2,883,183 | 5/1959 | Finsterwalder et al. | 74—89 X |
| 3,056,386 | 10/1962 | Aarvold et al. | 160—188 X |

FOREIGN PATENTS 518,238   2/1940   Great Britain.

DAVID J. WILLIAMOWSKY, *Primary Examiner.*

HARRISON R. MOSELEY, *Examiner.*

PETER M. CAUN, *Assistant Examiner.*